United States Patent [19]
Merner et al.

[11] 3,720,135
[45] March 13, 1973

[54] FEED RATE CONTROLLER

[75] Inventors: Kenneth R. Merner; Richard E. Stobbe, both of Greendale, Wis.

[73] Assignee: Kearney & Trecker Corp., West Allis, Wis.

[22] Filed: Feb. 1, 1971

[21] Appl. No.: 111,326

[52] U.S. Cl. ..........................90/14, 90/13 C, 408/3, 408/6, 408/11, 318/39, 318/571
[51] Int. Cl. ............................................B23b 47/24
[58] Field of Search ....408/12, 11, 6, 3; 318/39, 571; 90/11 R, 20, 13 C, 14; 173/7

[56] References Cited

UNITED STATES PATENTS

| | | | |
|---|---|---|---|
| 3,545,310 | 12/1970 | Porath et al. | 408/11 |
| 3,107,903 | 10/1963 | Newton | 408/11 X |
| 3,162,249 | 12/1964 | Kuipers et al. | 173/7 |

*Primary Examiner*—Gil Weidenfeld
*Attorney*—Cyril M. Hajewski, William C. Gleisner and Donald E. Porter

[57] ABSTRACT

An apparatus to eliminate the stalling of a machine tool spindle electric drive motor when a cutting tool secured in the spindle encounters a hard spot in a workpiece. A current relay is connected in the spindle motor circuit and is energized upon the occurrence of an abnormal load on the spindle motor. A normally closed contact of the relay is located in the feed axis drive system and effects the interruption of the command pulses to the feed axis drive system.

4 Claims, 7 Drawing Figures

INVENTORS
Kenneth R. Merner,
& Richard E. Stobbe
By Cyril M. Hajewski
Attorney

FEED RATE CONTROLLER

BACKGROUND OF THE INVENTION

The present invention relates generally to machine tool control systems and more particularly to an automatic feed rate interruption control for the feed axis drive system of a machine tool which uses electric drives.

In a machine tool such as a milling machine, a cutting tool is rotated at a predetermined rate and is simultaneously moved at a predetermined feed rate relative to a workpiece. As is known in the art, the speed rate of the cutter and feed rate of the cutting tool into the workpiece are preset according to a number of variable factors such as the size of the cutter, the kind of metal being machined, and the amount of metal to be removed during a particular machining operation.

Sometimes during normal operation, the cutter in the spindle will encounter a hard spot in the workpiece. When it does, the current in the electric motor driving the spindle will rise. A device called a current limit is employed in the spindle drive motor control circuit and acts to limit the motor current drawn to a preset value. If the motor current drawn stays under the current limit, the spindle will develop the necessary torque needed to cut through the hard spot. But typically what happens, especially at lower spindle speeds, is that as the spindle will begin to stall, the spindle will continue to draw more current until it reaches the current limit. At this time, the motor current is limited by the current limit and the spindle will stall because it cannot develop the horsepower necessary to cut through the hard spot. The present invention overcomes the problem of spindle stalling by providing a simple circuit means to interrupt the feed axis drive motor when the current in the spindle motor rises to a predetermined level thereby preventing the spindle motor current from reaching the value at which the current limit is set.

SUMMARY OF THE INVENTION

According to this invention, there is provided a machine tool having a work support adapted to carry a workpiece; a rotatable spindle adapted to carry a cutting tool for engaging the workpiece carried by the work support; a servomotor connected to effect relative movement between the spindle and the work support; a positioning control system operative to provide output command signals connected to actuate the servomotor for effecting predetermined relative movement between the spindle and work support; an electric motor operable to drive the spindle at a selected rate; a current relay interconnected in the spindle electric motor circuit being energized upon the occurrence of an abnormal load on the spindle electric motor; and a normally open contact of the current relay located in the positioning control system and being operable to interrupt the flow of the output command signals to the servomotor, thereby effecting the slowing down or stopping of the feed motion.

It is the object of this invention to provide a simple, inexpensive means for preventing the stalling of an electric spindle drive motor.

DESCRIPTION OF THE PREFERRED EMBODIMENTS

Figure 1:
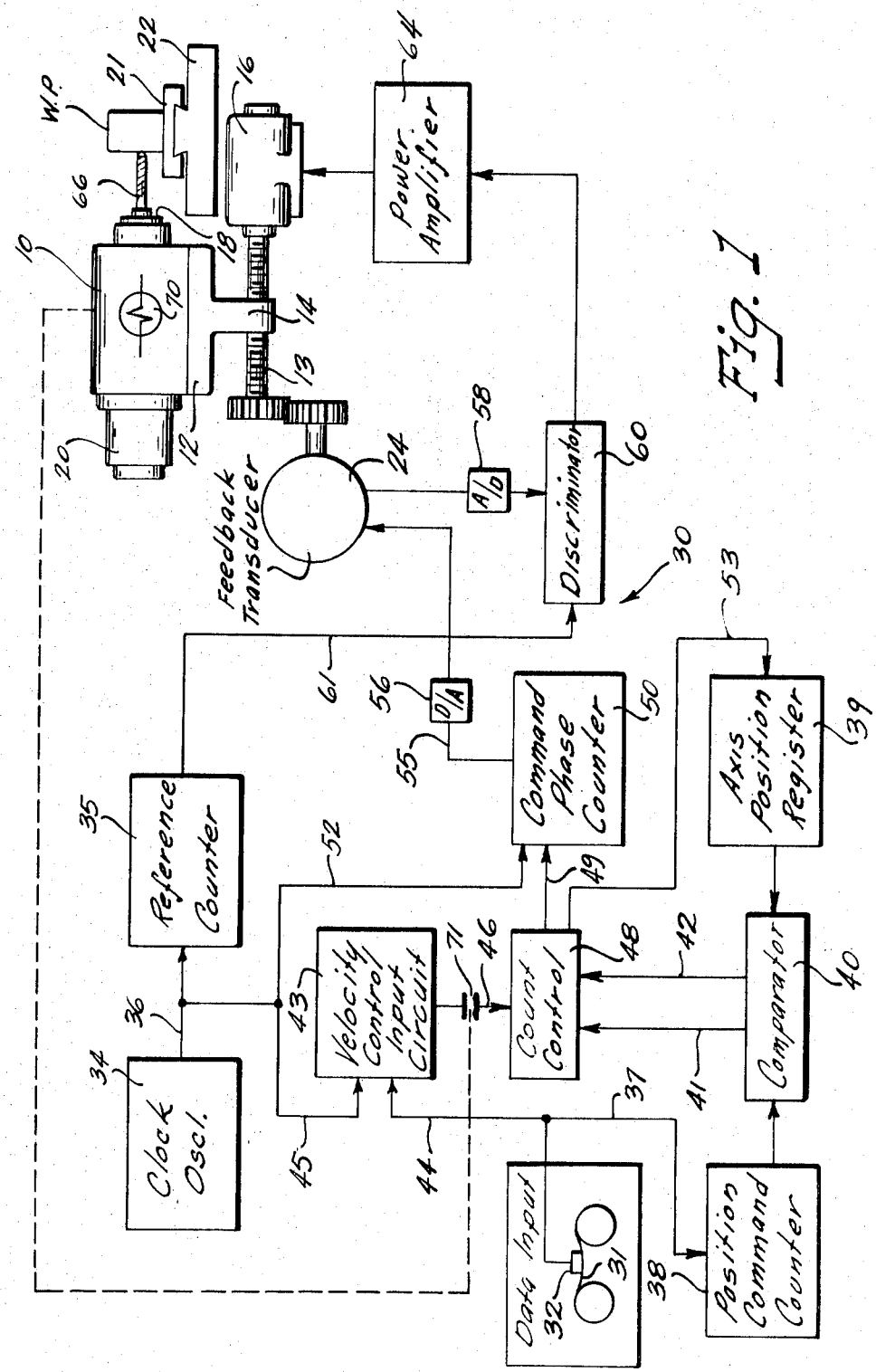
FIG. 1 is a schematic diagram of a positioning control system of a machine tool, incorporating the features of the present invention.

Referring now to FIG. 1, there is shown therein a machine tool spindle drive and feed arrangement incorporating the features of the present invention. A spindle head 10 is carried on a movable slide 12 for a cross-feeding movement in a horizontal path. Horizontal movement of the slide 12 in either direction is effected by rotating a screw 13 which is in threaded engagement with a nut 14 that is fixed to the slide 12. An electric motor 16 is connected to rotate the screw 13 for moving the slide 12 at a selected feed rate and in a selected direction of movement. The spindle head 10 rotatably supports a spindle 18 that is adapted to carry a tool to rotate with the spindle 18 for performing a work operation. The spindle 18 is horizontally mounted within the spindle head 10. The spindle 18 is driven in its rotary movement by a motor 20 controlled automatically from recorded data or by manual manipulation of an electric control system (not shown) in a well-known manner. Thus, to perform machining operations, the tool spindle 18 is selectively movable along a horizontal axis relative to a workpiece W.P. secured to a worktable 21 which, in turn, is secured to a worktable support 22.

A linear position feedback transducer 24 is operatively connected to the screw 13 and is utilized to detect the linear horizontal position of slide 12. The position feedback transducer 24 is of a resolver type, well-known in the art.

The positioning control system 30 schematically illustrated in FIG. 1 is of the well-known pulse counting type produced commercially by several different manufacturers and incorporating well-known digital techniques. The positioning control system 30 controls the movements of the slide 12 which supports the spindle head 10. To employ digital control techniques, the numerical control system includes a means to generate the pulse signals. These pulses are cyclical in nature with each complete cycle or pulse of the signal representing an increment of movement of the working tool. For example, each pulse signal when utilized by the control and applied to the machine tool may cause 0.0001 inch of movement of the slide 12.

The number of pulses so generated may thus be considered a function of the amount of movement of the slide 12 since each pulse causes a certain incremental movement. Likewise, the rate of frequency at which the pulses are generated is a function of the velocity of the slide 12 as the pulse rate represents the number of incremental movements per unit of time.

The positioning control system 30, shown in FIG. 1, controls the position of the slide 12 by keeping track of the total number of pulses generated, for example, by feeding the counts to counters or registers. Thus, a counter controlling movement along the horizontal axis will receive 10,000 counts for each inch of travel of slide 12 along that axis.

In a similar manner, control 30 controls the velocity or rate of movement of slide 12 along the horizontal axis by means of circuitry responsive to the frequency at which the pulses are generated, or the pulse rate. The responsive circuitry moves slide 12 through the number of incremental movements per unit of time corresponding to the pulse rate.

A program is encoded or punched on a tape 31 so as to provide data input signals to control 30 by means of a tape reader 32. In addition to the tape reader 32, the input circuitry to control 30 includes a clock oscillator 34. Clock oscillator 34 produces stable high frequency pulse signals, for example, a pulse train having a frequency of 250 kilohertz. Each pulse of this pulse train when employed by control 30 represents 0.0001 inch of movement of the slide 12. The pulse signals from clock oscillator 34 are in the form of symmetrical square waves; that is, the interval of each pulse signal, or the pulse width, is equal to the interval between pulses.

The pulses are formed by periodically changing the output state of clock oscillator 34 from one state to another state. For example, the clock oscillator may initially provide no output signal, then provide an output signal for the interval of a pulse, then revert to a state of providing no output signal for a similar interval, then provide an output signal for the interval of a second pulse and so on. Only the provision of the output signal is important to digital control, not the magnitude thereof.

The output from clock oscillator 34 is supplied to other portions of control 30 and to reference counter 35, via conductor 36. Reverence counter 35 produces a plurality of lower frequency of pulse signals which are employed by the other components of control 30.

Tape reader 32 provides a position command signal via conductor 37 to position command register 38. This input signal presents that register or counter in accordance with the desired position of slide 12 on the horizontal axis.

The position control circuitry also includes an axis position register 39 which records the actual movement of slide 12 in terms of the pulse signals representing 0.0001 inch of movement. Since one pulse signal or count from clock oscillator 34 represents 0.0001 inch of movement, to command a movement of slide 12 1 inch along the horizontal axis, 10,000 counts must be added to or subtracted from the count on position register 39. Whether the counts will be added or subtracted depends on the desired direction of movement of slide 12. The pulse signals or counts are supplied to axis position register 39 in a manner hereinafter described.

The output signal from position command register 38 and axis position register 39 are supplied to a comparator 40 which determines whether the number of counts in the axis position register 39 is greater or less than the number of counts in the position command register 38.

Comparator 40 provides an output signal to conductor 41 indicating that the position registered in the axis position register 39 is greater than the position registered in the command position register 38. Comparator 40 provides an output signal to conductor 42 indicating the position registered in the axis position register 39 is less than the position registered in the command position register 38. When the position registered in the axis position register 39 equals the position registered in the command position register 38, indicating that slide 12 is in the command position, comparator 40 provides a signal in conductors 41 and 42 which operates control 30 to stop the movement of slide 12.

As previously noted, control 30 employs the frequency at which the pulses representing 0.0001 inch of movement are generated to control the velocity of slide 12. As control 30 moves slide 12 0.0001 inch for every such pulse generated, the greater the number of incremental movements per unit of time the greater the velocity of slide 12.

To detect the frequency or rate at which pulses are being generated, the velocity control circuitry of control 30 employs a pair of low frequency pulse trains as carrier signals. One of the carrier signals is utilized as a reference signal. The phase of this signal remains constant. The other carrier signal is responsive to the rate of pulse generation and the phase of this other carrier signal may be phase shifted at a rate equal to the rate of pulse generation.

As the rate of change of the phase shift difference between the constant phase reference carrier signal and the phase shifted carrier signal is equal to the rate of pulse generation, this rate of change may be detected and a signal corresponding thereto provided to the electric motor 16, energizing slide 12 to move slide 12 through the required number of incremental movements per unit of time. A feed back signal is provided in the velocity control circuitry of control 30 to indicate actual movement of slide 12, also in terms of a phase shift of the second carrier signal. In the normal manner of a regulator, the feed back signal operates to shift the phase of the carrier into conformity with the phase of the reference carrier signal, thereby indicating that the slide 12 is moving at the desired velocity.

The velocity control circuitry of control 30 includes a velocity control input circuit 43 which receives and stores the velocity input command signals from tape reader 32, via conductor 44.

The velocity input circuitry 43 also receives the high frequency pulse signals from clock oscillator 34, via conductor 45. These high frequency pulse signals are formed by velocity control input circuit 43 into an output pulse train, the frequency, or rate of pulse generation, of which corresponds to the desired speed of slide 12. For example, velocity control input circuit 43 may reduce the 250 kilohertz pulse train of clock oscillator 34 to a 10 kilohertz output signal. The 10 kilohertz frequency of this signal represents a desired speed of 1 inch per second of slide 12, since 10,000 pulses are being generated each second, each pulse being equal to 0.0001 inches of movement of slide 12.

The pulse train output signal of velocity control input circuit 43 in conductor 46 and the output signals from comparator 40 are supplied to count control circuit 48. Count control circuit 48 thus receives an input signal relating to the desired rate of movement of slide 12, as provided by the 10 kilohertz pulse train from velocity control input circuit 43 and a signal relating to the direction of such movement, as provided by comparator 40. Circuit 48 provides an output signal in conductor 49 in response to the input signals thereto which controls the operation of a command phase counter 50.

Command phase counter 50 generates the second or phase shifted carrier signal employed by the velocity control circuitry of control 30. Command phase counter 50 receives the 250 kilohertz pulse train from clock oscillator 34, via conductor 52 and divides this 250 kilohertz input signal by 1,000 to produce a 250 hertz low frequency pulse train carrier signal. The input signal from count control circuit 48 operates command phase counter 50 to advance or retard the phase of the 250 hertz carrier signal at a rate equal to the frequency of the pulse train signal from velocity control input circuit 43. The direction in which the signal is shifted, that is, whether the signal is advanced or retarded in phase, is determined by a signal from comparator 40 to count control circuit 48 and determines the direction of movement of slide 12.

To advance or retard the phase of the 250 hertz carrier signal from command phase counter 50, the pulse train signal from count control 48 is employed to affect the divide by 1,000 operation of command phase counter 50, and specifically, the application of the 250 kilohertz pulses from clock oscillator 34 to the counter. If, as in the previously used example, it is desired to move slide 12 at a velocity of 1 inch per second, the phase of the 250 hertz carrier signal must be phase shifted by a total of 10,000 pulses over the time period of a second. The 250 hertz carrier signal of command phase counter 50 must be phase shifted one pulse every 100 microseconds in order to provide the required phase shift rate of 10,000 pulses per second. It may be noted that a phase shift of 10,000 pulses represents a phase shift of 10 complete cycles of 250 hertz carrier signal.

This phase shift is provided by utilizing the 10,000 hertz pulse train signal from count control 48 to affect the application to command phase counter 50 of one pulse out of every 25 pulses of the 250 kilohertz, or 250,000 hertz, clock oscillator 34 pulse train. If it is desired to retard the phase of the 250 hertz carrier signal of command phase counter 50, the 10,000 cycle per second pulse signal, from count control 48 in conductor 49 will block one out of every 25 clock oscillator pulses supplied to command phase counter 50, thereby retarding the generation and phase of the carrier signal provided by command phase counter 50 by the amount of the one blocked clock oscillator pulse. Over the period of a second, 10,000 clock oscillator pulses supplied to command phase counter 50 will be blocked, thus providing the desired rate of change, or phase shift, to the 250 hertz carrier signal of command phase counter 50. If it is desired to advance the phase of the 250 carrier signal of command phase counter 50, the 10,000 cycle per second pulse signal from count control 48 will operate command phase counter 50 to add the equivalent of one clock oscillator pulse every 25 clock oscillator pulses supplied to command phase counter 50, thereby advancing the phase of the carrier signal by the amount of the added clock oscillator pulse.

As each of the 250 kilohertz clock oscillator pulses are added or blocked in advancing or retarding the 250 hertz second carrier signal of command phase counter 50, a signal corresponding to the addition or blocking of these pulses is supplied via conductor 53 to axis position register 39 which records the movement of slide 12. The movement of slide 12 and the addition or removal of pulses to axis position register 39 will be such as to bring the number of pulses recorded in axis position register 39 into conformity with the position recorded in position command register 38. Thus, if the position registered in position command register 38 commands 1 inch of movement of slide 12 along the horizontal axis, 10,000 pulses will be added to axis position register 39 by the resulting action of count control circuit 48.

The phase shifted signal from command phase counter 50 in conductor 55 is fed through a digital to analog converter 56 to transducer 24. Transducer 24 is responsive to the actual movement of slide 12 and provides a phase shift to the output signal from command phase counter 50 proportional to this movement. This phase shift to the output signal of command phase counter 50 is opposite to the phase shift provided by count control 48 as it indicates actual movement of slide 12. This phase shifting of the output signal of transducer 24 is applied to the already phase shifted carrier signal of command phase counter 50 and acts to restore the 250 hertz signal from command phase counter 50 to its original phase.

The output signal from transducer 24 is supplied through an analog to digital converter 58 to discriminator 60. Analog to digital converter 58 restores the signal from transducer 24 to a square wave signal. Discriminator 60 also receives a 250 hertz signal from reference counter 35 via conductor 61. The 250 hertz signal to discriminator 60 from reference counter 35 forms the reference carrier signal. The phase of the reference carrier signal remains constant. Discriminator 60 acts to determine the phase difference between the constant phase reference carrier signal from reference counter 35 and the phase shifted feedback signal from transducer 24 and to supply a digital difference signal corresponding to the difference between the phase of the two signals to a power amplifier 64 which, in turn, drives the feed rate motor 16.

Figure 2A:
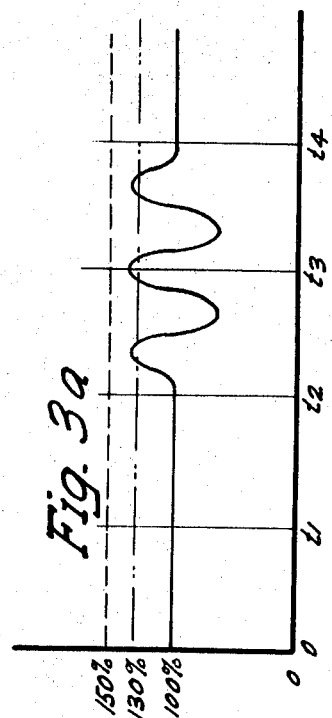
FIGS. 2a, 2b and 2c are a representation of curves indicating the relationship of spindle motor current, spindle motor speed and feed rate obtained without the present invention.
Figure 2B:
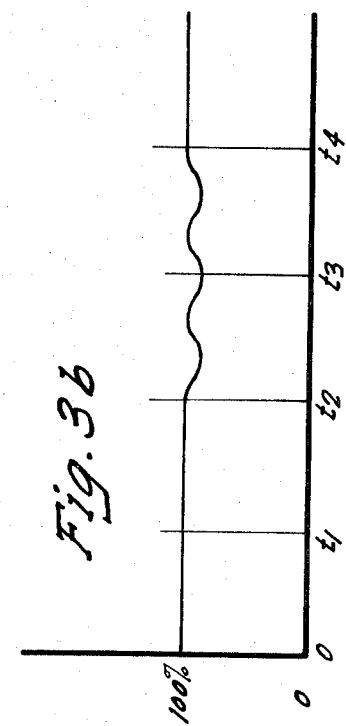
Figure 2C:
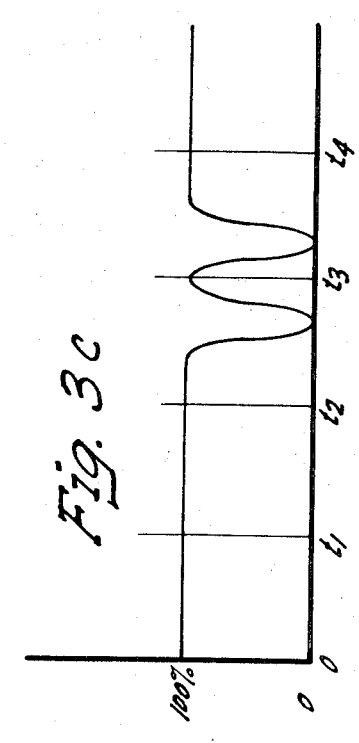

FIGS. 2a, 2b and 2c are a representation of curves depicting the relationship of the spindle motor 20 current, speed, and the feed rate movement of the slide 12, before the present invention was incorporated into the controls.

Assume, as illustrated in FIGS. 2a, 2b and 2c, that the data input has instructed the machine control to rotate the spindle 18 at a certain desired speed which we shall label 100, and for the slide to move a cutting tool 66 into engagement with the workpiece W.P. at a desired feed rate which we shall label 100, and that with the spindle motor 20 rotating at the desired speed and moving at the desired feed rate, that the spindle motor 20 is drawing 100 percent rated current. Let us assume further that at time $t2$ the cutting tool 66 encounters a hard spot in the workpiece, such as a weld. This will effect the slowing down of the spindle motor 20 with an accompanying increase in spindle motor current, as depicted in FIGS. 2a and 2b. Unless the hard spot is passed, the spindle motor current, as depicted in FIG.

2a, will continue to rise until the motor current reaches the current limit, which in our example is set at 150 percent full load motor current. The current limit (not shown), a circuit well known in the art, is used to limit the current a motor can draw to some safe level which prevents the motor from overheating and burning up. The spindle motor 20 being unable to draw any more current will not be able to develop enough torque to cut through the hard spot. The motor speed, as shown in FIG. 2b at time t3, will continue to drop off sharply until the motor stalls. A speed circuit (not shown), in a manner well-known in the art, will shut off the feed rate drive when the speed of the spindle motor 20 drops to 65 percent of the speed that is called for by the input data. Quite frequently, the stalling of the spindle motor will result in a jam up of the cutting tool in the workpiece resulting in either damage to the workpiece or damage to the machine or damage to both.

Figure 3A:
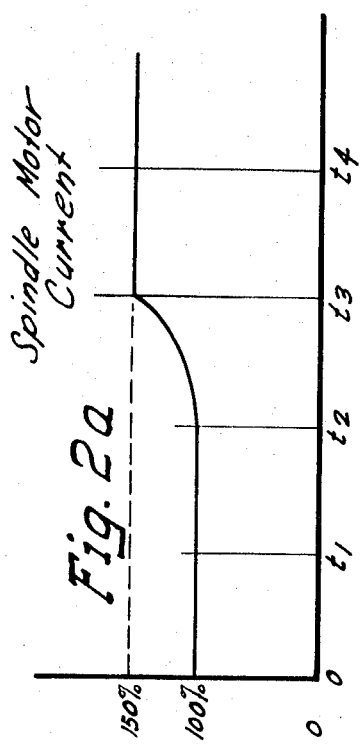
FIGS. 3a, 3b and 3c are a representation of curves indicating the relationship of spindle motor current, spindle motor speed and feed rate obtained with the present invention.
Figure 3B:
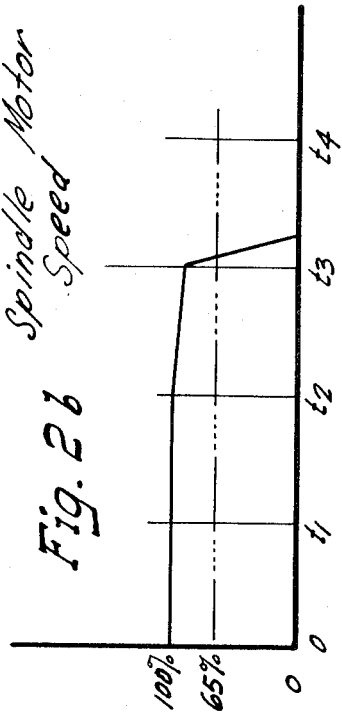
Figure 3C:
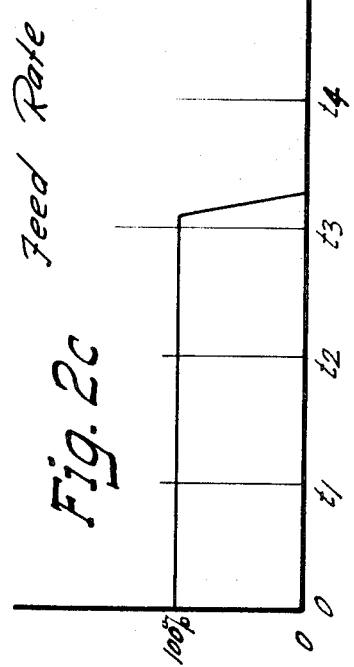

FIGS. 3a, 3b and 3c are a representation of curves depicting the relationship of spindle motor 20 current, speed, and the feed rate movement of the slide 12 with the present invention incorporated in the control as illustrated in FIG. 1.

Assume, as we did in the previous example, that cutting tool 66 is cutting into the workpiece and at time t1 the spindle motor is rotating at a speed called for by the data input which we again label as 100. Also, at time t1 with the spindle motor rotating at the desired speed 100, the spindle motor is drawing 100 percent rated current as the slide 12 is moving at the desired feedrate which we again label as 100. Assume further that at time t2 the cutting tool 66 encounters a hard spot in the workpiece. This will again effect the slowing down of the spindle motor 20 with an accompanying increase in spindle motor current, as depicted in FIGS. 3a and 3b. Unless the hard spot is passed the spindle motor current, as depicted in FIG. 3a, will continue to rise until we reach 130 percent of rated motor current. At this time a current relay 70, located in the spindle motor armature circuit, will be energized effecting the opening of a normally closed contact 71, located in the positioning control system 30 between the velocity control input circuit 43 and the count control 48. The opening of contact 71 will interrupt the flow of pulses to the count control 48 effecting the stoppage of the feed axis drive motor 16, as depicted in FIG. 3c. The cutting tool will continue to machine out the hard spot and will draw no more current because the feedrate has been interrupted. The spindle motor 20 speed will now pick up with an accompanying drop in spindle motor current, as depicted in FIGS. 3a and 3b. When the spindle motor current drops below 130 percent full load current, the current relay 70 will drop out. The normally closed contact 71 will close and again we will have pulses flowing from the velocity control input circuit to the count control effecting the feed axis drive system to resume its desired feed rate of 100. If we have not passed through the hard spot, the spindle motor speed will again slow down with an accompanying increase of spindle motor current until we again reach 130 percent of full load current. At this time, the current relay 70 will again pick up effecting the interruption of the feed axis drive motor 16. The feed axis drive motor will start-stop-start-stop until we clear the hard spot. Thus, the spindle motor current is prevented from reaching the current limit and the stalling of the spindle motor 20 is prevented.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool having a rotatable tool spindle and a work support;
    a spindle motor connected to rotate said tool spindle;
    feed drive means operative to effect relative movement between said spindle and said work support to produce relative movement between a rotating cutter carried by said spindle and a workpiece carried by said work support;
    a positioning control system issuing control signals to regulate the operation of said feed drive means; and
    overload means responsive to an overload on said spindle motor to interrupt the flow of control signals and thereby interrupt the operation of said feed drive means to relieve the overload on said spindle motor and thereby restore operation of said feed drive means so that said feed drive means will operate intermittently when the cutter is encountering unusual resistance to its cutting operation.

2. A machine tool according to claim 1 wherein said spindle motor is an electric motor; and
    said overload means is a current relay connected in the circuit to said motor so that it is actuated by the increased current in said circuit caused by the overload on said motor; and
    said relay has a normally closed contact connected in a conductor carrying said control signals so that actuation of said relay opens said normally closed contact to thereby interrupt the operation of said feed drive means.

3. A machine tool according to claim 1 wherein said positioning control system is a numerical control circuit for regulating the operation of said feed drive means; and
    the actuation of said overload means serves to interrupt the flow of command pulses to thereby interrupt the operation of said feed drive means.

4. A machine tool according to claim 2 wherein said positioning control system is a numerical control circuit for regulating the operation of said feed drive means; and
    said normally closed contact is connected in a conductor which carries command pulses for regulating the operation of said feed drive means so that opening of said normally closed contact serves to interrupt the flow of command pulses and thereby terminate the operation of said feed drive means.

* * * * *